D. W. MARTIN.
TIMBER HOOK.
APPLICATION FILED MAR. 3, 1913.
1,097,813.
Patented May 26, 1914.
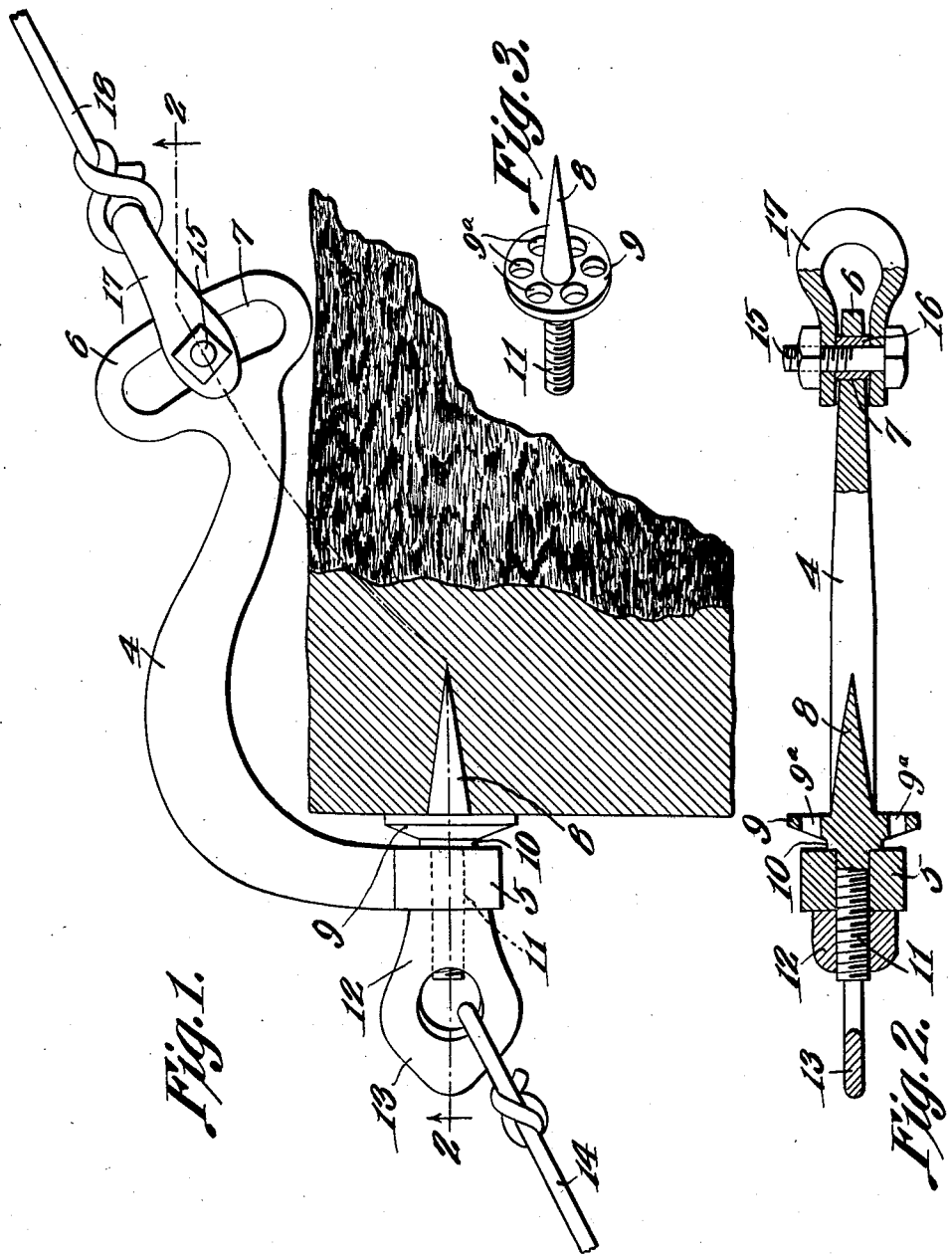
Witnesses
Daniel W. Martin,
Inventor
by C. A. Snow & Co.
Attorneys

UNITED STATES PATENT OFFICE.

DANIEL W. MARTIN, OF LUFKIN, TEXAS.

TIMBER-HOOK.

1,097,813.  Specification of Letters Patent.  Patented May 26, 1914.

Application filed March 3, 1913. Serial No. 751,892.

*To all whom it may concern:*

Be it known that I, DANIEL W. MARTIN, a citizen of the United States, residing at Lufkin, in the county of Angelina and State of Texas, have invented a new and useful Timber-Hook, of which the following is a specification.

The present invention appertains to timber hooks, and is particularly an improvement over the device disclosed in my former Patent Number 842,220 issued January 29th 1907.

It is the object of the present invention to provide a novel and improved timber hook, a pair of which may be attached to the respective branches of a crotch line in such a manner that the hooks may automatically adjust themselves according to the various lengths of logs engaged or supported thereby.

As a further object, the present invention aims to provide a hook of the character indicated embodying a spur or tooth at one end and a coupling member movably engaged to the other end of the hook and adapted to swing about the spur or tooth as a center, the coupling member being attachable to the branch of the crotch line, in order that the hook and branch of the crotch line may adjust themselves to accommodate a particular log and in order to permit the spur to properly enter the end of the log.

As another object, the present invention aims to provide a detachable spur or tooth, which is provided with a peculiar flange at its butt end or root in order to bear against the end of the log so as to prevent the log from splitting, and in order to assist in the ejectment of the spur or tooth after the crotch line has been slackened relative to the log.

A still further object of the present invention is to provide a spur having a shank insertible through one end of the hook, in connection with a member engaged to the free end of the shank and to which the jerk line is attachable.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The preferred embodiment of the invention has been illustrated in the accompanying drawings, wherein:—

Figure 1 is a side elevation of the hook, illustrating the same as applied to the end of the log. Fig. 2 is a sectional view of the hook taken on the line 2—2 of Fig. 1. Fig. 3 is a perspective view of the spur or tooth.

Referring specifically to the drawing, the hook proper or the body of the hook has been designated by the numeral 4, the same being suitably fashioned of metal and being bent on approximately a compound or ogee curve. The hook 4 is provided at one end or its outer end, with an eye 5, and is provided at its other or inner end with a transverse head 6 having an elongated slot 7 therein forming a transverse loop.

The spur or tooth has been designated by the numeral 8, the same being pointed or conical and having a flange 9 at its base, root or butt end. The flange 9 is provided with an annular series of apertures or openings $9^a$, and is provided with a boss or abutment 10. A threaded stem or shank 11 projects from the abutment 10 and is passed loosely through the eye 5 of the hook, a nut 12 being threaded on the free or projecting end of the stem or shank 11 and being provided with a flattened loop or eye 13 adapted to be engaged by the jerk line 14. The nut 12 in engaging the end of the stem or shank 11 will retain the spur or tooth in position, but will permit the same to rotate if the nut is slightly loosened.

The bolt 15 passes through the slot 7, and has mounted thereon a roller 16 working within the slot, the said roller providing an antifrictional means whereby the bolt may slide readily within the slot. A clevis 17 has its end or terminals engaging the bolt 15, the roller 16 being disposed between the ends of the clevis and one branch 18 of the crotch line being attached to the clevis. The slot or guide 7 is curved about a point at the base or root of the spur or tooth as a center, so that the clevis 17 may stand radially relative to the base of the tooth or spur when the hook is engaged to the end of a log, as will hereinafter appear.

In use, it being understood that one of the hooks is attached to each branch of the crotch line, the hooks are engaged to the ends of a log in the usual manner, the spurs or teeth 8 taking into the ends of the log. Thus each tooth or spur 8 will bite or take into the end of the log to cause the flange 9 to seat against the end of the log. It has been found in practice, that the apertures or openings 9ª in the flange will so engage the end of the log as to prevent the same from splitting due to the insertion or introduction of the tooth, and furthermore, the flange will permit and assist in the ejection of the tooth or spur when the weight of the log is relieved from the hook, as by slackening the crotch line.

One of the features of the present invention is the fact that the branches of the crotch line are so attached to the hooks that the branches may adjust themselves radially relative to the bases of the teeth or spurs, in order that the teeth or spurs may engage straight into the ends of the log, and in order that the flanges 9 may properly seat or bear against the ends of the log. Thus, when the apparatus is employed with various lengths of logs, it will be noted that the branches of the crotch will open and close according to the lengths of the logs, but if the branches were attached directly to the hooks as disclosed in the above mentioned patent, the hooks would only properly engage with logs of a certain length, and with other lengths of logs the hooks would stand diagonally or out of proper position. With the present hook, however, the hook may properly engage the end of the log, the clevis 17 moving along the slot 7 so as to permit the hook and branch of the crotch line to adjust themselves according to the length of the log, the clevis and branch of the crotch line standing radial to the base of the spur or tooth. The spur or tooth not only effectually engages the end of the log, but may be removed or replaced when necessary, this being accomplished by unscrewing or removing the nut 12 from the stem or shank 11 of the spur. It is also to be noted, that when the jerk line 14 is employed for releasing the spur or tooth, the pull exerted on the same will be transmitted directly to the spur or tooth, the tension of the jerk line also tending to slightly rotate or vibrate the spur or tooth so as to readily and quickly cause withdrawal thereof.

The present hook is easily and inexpensively manufactured, and is efficient and convenient in its use. The other advantages of the present hook will be manifest to those versed in the art, it being noted that the objects aimed at have been carried out satisfactorily.

What is claimed as new is:—

1. A timber hook having a spur at one end, and a guide at its other end curved about a point at the base of the spur as a center, and a coupling member for the attachment of a branch of a crotch line movable along the said guide.

2. A timber hook having a spur at one end, and a guide at its other end curved about a point at the base of the spur as a center, a coupling member for the attachment of a branch of a crotch line, and a roller carried by the coupling member and movable in the said guide.

3. A timber hook having a spur at one end, and having a slot in its other end curved about a point at the base of the spur as a center, and a coupling member for the attachment of a branch of a crotch line movable in said slot.

4. A timber hook having a spur at one end, and having a slot in its other end curved about a point at the base of the spur as a center, a bolt working through the slot, and a clevis having its ends engaged to the bolt.

5. A timber hook having a spur at one end and having a slot in its other end curved about a point at the base of the spur as a center, a bolt passing through the slot, a clevis having its ends engaged to the bolt, and a roller mounted on the bolt between the ends of the clevis and working within the slot.

In testimony that I claim the foregoing as my own, I have hereto affixed my signature in the presence of two witnesses.

DANIEL W. MARTIN.

Witnesses:
J. O. SATTERWHITE,
KESTER W. DENMAN.

---

Copies of this patent may be obtained for five cents each, by addressing the "Commissioner of Patents, Washington, D. C."